Feb. 5, 1924.                                                     1,482,893
                        E. HART
              LENS MOUNT FOR OPTICAL INSTRUMENTS
                   Filed Oct. 20, 1920
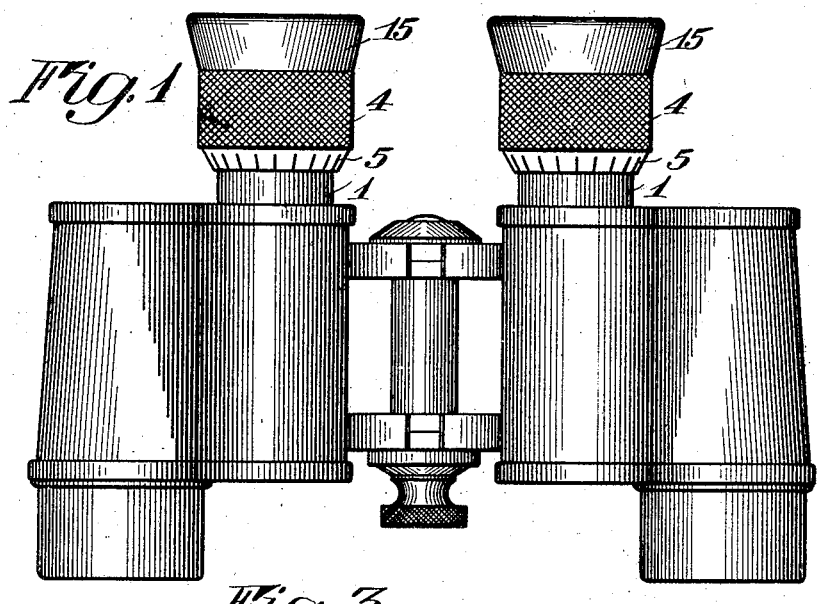
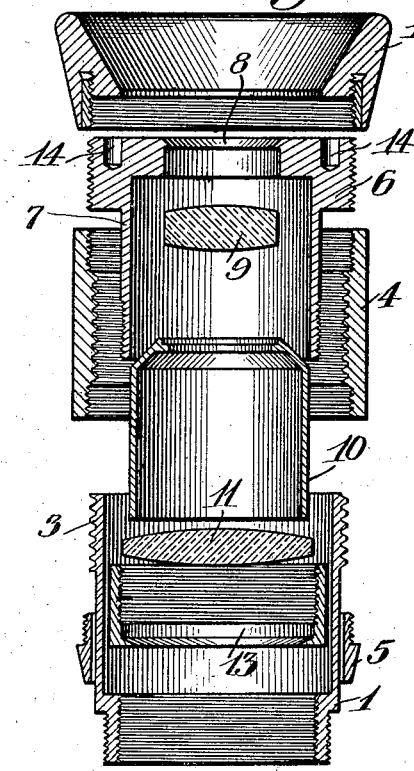
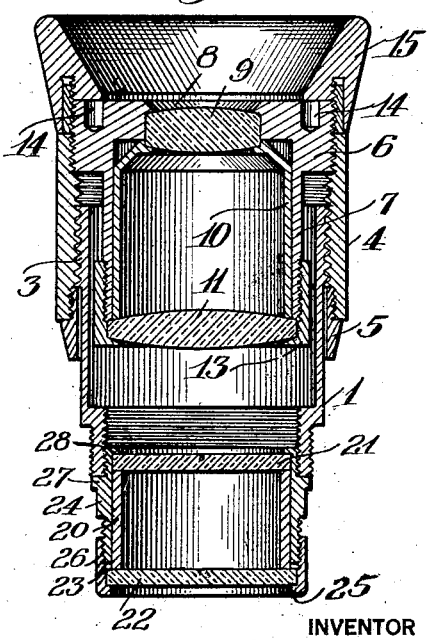
INVENTOR
Edwin Hart
BY
his ATTORNEY Patented Feb. 5, 1924.

1,482,893

UNITED STATES PATENT OFFICE.

EDWIN HART, OF ROCHESTER, NEW YORK, ASSIGNOR TO BAUSCH & LOMB OPTICAL COMPANY, OF ROCHESTER, NEW YORK, A CORPORATION OF NEW YORK.

LENS MOUNT FOR OPTICAL INSTRUMENTS.

Application filed October 20, 1920. Serial No. 418,152.

*To all whom it may concern:*

Be it known that I, EDWIN HART, a citizen of the United States, and resident of Rochester, in the State of New York, have invented new and useful Improvements in Lens Mounts for Optical Instruments; and I do declare the following to be a full, clear, and exact description of the same, reference being had to the accompanying drawings forming a part of this specification.

My invention relates to lens mounts for optical instruments such as binoculars, telescopes, microscopes and the like. In instruments of this kind it has been found that the oil used in lubricating the parts is liable to work into the body of the instrument and smear its lens surfaces. It has also been found that in screwing and unscrewing the tubes fine particles of the metal are liable to flake off and get on the optical surfaces. This difficulty is especially hard to overcome as the particles cannot be removed without unscrewing and again screwing up the tubes with the result that other particles are loosened which again settle on the optical surfaces of the instrument. The object of my invention is to overcome these difficulties, by constructing a lens mount with all lubricated parts outside of the instrument body, by forming all retaining ring screw threads externally of the lens mounting or tube so that no particles can fall upon the faces of the lenses, and by distributing the screw threads for removal of optical units in a novel manner.

In the drawings,

Figure 1 is a front elevation of a binocular telescope embodying my invention.

Figure 2 is a transverse section of an eyepiece showing the location of the threads and connecting parts, and Figure 3 is a similar view with the parts disassembled.

Similar reference numerals refer to the same parts throughout all the figures of the drawings.

I have shown my invention applied to the eyepiece of a binocular telescope although it is applicable to all optical instruments employing tubular lens mounts. The eyepiece illustrated in the drawings comprises a tubular support or sleeve 1 threaded at its end to engage an opening in the body of the binocular case. The tube 1 is also internally threaded adjacent its inner end to receive a mill scale tube which is externally threaded to engage the internal threads of the tube 1. The outer end or the tube 1 is threaded as at 3 to cooperate with internal threads on a sleeve 4 which is adjustable longitudinally on the tube 1. The ends of the sleeve 4 are counterbored and internally threaded to receive a graduated collar 5 at its inner end which serves to limit the outer adjustment of the sleeve 4 on the tube 1 by engaging the threads or projections 3. A tube 6 having an externally threaded outer end is screwed into the outer end of the sleeve 4 and has an inwardly projecting sleeve 7 having a reduced external diameter and externally threaded at its inner end. The threads at the outer end of the tube 6 are intermeshed with the thread at the outer end of the sleeve 4. The outer end of the tube 6 is also provided with a shouldered aperture 8 with which the edge of the outer face of the front combination lens 9 cooperates. A sleeve or tubular member 10 having a reduced outer end, and a shouldered aperture therein cooperates with the inner face of the lens 9 and at its inner end engages the outer edge of the inner face of a rear combination lens 11. The sleeve 7 surrounds the sleeve 10 and at its inner end engages the edge of the lens 11. A tubular member or sleeve 13 having a shouldered aperture at its inner end engages the edge of the outer face of the lens 11 and is threaded into engagement with the external threads on the sleeve 7. By this construction it will be noted that the members 4, 6, and 13 are screwed together and form a unit adjustable on the supporting tube 1, said adjustment being for the purpose of focusing the instrument.

If desired the outer end of the tube 6 may be provided with spanner wrench holes 14 by which the parts may be unscrewed by the use of a wrench when necessary. An outer shield 15 may be screwed on to the outer end of the tube 6 into engagement with the outer end of the sleeve 4 and serves as a protection for the front lens 9.

It will be noted that the lenses 9 and 11 are mounted within the externally threaded tube 6 and clamped against the opposite ends of the spacing sleeve 10 by means of the tube 13 screwed into engagement with the external thread on the sleeve 7. By this construction the lenses are entirely protected from any particles which may work loose from any of the screw threads employed in securing the parts together. They are also protected from a liability of oil coming in contact with their surfaces. It will also be noted that the mill scale and its disks are so positioned within the supporting tube 1 as to be practically free from any liability of particles or oil reaching them.

A mill scale mount constructed according to my invention is illustrated in Figure 2 of the drawings and comprises a spacing sleeve 20 against the ends of which the transparent disks 21 and 22 are clamped by the interengaging tubes 23 and 24. The tube 23 has an internal flange 25 adjacent its outer end which engages the disk 22, and at its inner end is counterbored and internally threaded at 26. The tube 24 is externally threaded at its inner end to engage the internal threads in the tube 1, and has a circumferential flange 27 adapted to engage the outer end of the tube 1 and limit the inward movement of the tube 24. The tube 24 surrounds the sleeve 20 and is externally threaded adjacent its outer end to cooperate with the internal threads in the tube 23. Formed on the inner end of the tube 24 is a diaphragm 28 which engages the inner face of the mill scale disk 21 on the inner surface of which the mill scale is etched.

Having described my invention what I claim and desire to secure by Letters Patent is:

1. In a lens mount for optical instruments, the combination of front and rear combination lenses, a tube for spacing said lenses, and means for retaining said lenses in position on said spacing tube, said means comprising a tube adapted to engage the front combination lens and having an inwardly projecting externally threaded sleeve surrounding the spacing tube and an internally threaded sleeve surrounding said tube and the rear lens and adapted to retain the rear lens in position on the tube.

2. In a lens mount for optical instruments, the combination of front and rear combination lenses, a tube for spacing said lenses, a tube adapted to engage the front combination lens and having an externally threaded sleeve surounding said spacing tube, and a tube having an internally threaded sleeve surrounding said externally threaded sleeve and the rear lens and engaging said externally threaded sleeve and adapted to engage the edge of the rear combination lens.

3. In a lens mount for optical instruments, the combination of a supporting tube, a longitudinally adjustable tube having an inwardly projecting externally threaded sleeve; a lens spacing tube in said sleeve, a front combination lens between said adjustable and spacing tubes, a rear combination lens positioned against the inner end of said spacing tube, and an internally threaded sleeve surrounding and engaging said externally threaded sleeve and the rear lens, and adapted to retain the rear combination lens in position on the spacing tube.

4. In a lens mount for optical instruments, the combination of a supporting tube, a longitudinally adjustable tube having an inwardly projecting externally threaded sleeve, a lens spacing tube in said sleeve, a front combination lens between said adjustable and spacing tubes, a rear combination lens positioned against the inner end of said spacing tube, an internally threaded sleeve cooperating with said externally threaded sleeve and adapted to retain the rear combination lens in position on the spacing tube and means for adjusting said adjustable tube and sleeve carried thereby longitudinally of the supporting tube.

5. In a lens mount for optical instruments, the combination of a supporting tube, a sleeve adjustable thereon and provided with internal screw threads adjacent its outer end and a lens tube provided with external screw threads cooperating with the threads in said sleeve and carried thereon.

6. A lens mount for optical instruments comprising a tubular support, a sleeve having internal screw threads adjacent its outer end adjustable on said support, a tube threaded into said sleeve and carried thereby and having an externally threaded inwardly projecting portion, a lens spacing device in said tube, and a retaining sleeve cooperating with said externally threaded tube.

7. The combination with a supporting tube, of a lens tube longitudinally adjustable within said supporting tube, a sleeve secured to the lens tube and extending over said supporting tube, and means on the outside of the supporting tube and inside the sleeve for producing a longitudinal adjustment between them.

8. The combination with a supporting tube, of a sleeve carried by the outside of said tube and longitudinally adjustable relative thereto, and a lens tube fixed to said sleeve adjacent an end thereof, said lens tube projecting into said supporting tube but out of contact with the inside thereof.

9. The combination with an externally threaded supporting tube of an internally threaded sleeve in cooperation with said tube and rotarily adjustable relative thereto, and a lens tube carried by said sleeve adjacent and end thereof, said lens tube projecting into said supporting tube and being longitudinally movable within as the sleeve is adjusted thereon.

EDWIN HART.